United States Patent [19]
Henriksson

[11] Patent Number: 5,603,465
[45] Date of Patent: Feb. 18, 1997

[54] FISHING REEL DRAG WITH ADJUSTING KNOB BEHIND THE SPOOL

[75] Inventor: Bengt-Åke Henriksson, Svängsta, Sweden

[73] Assignee: ABU AB, Svängsta, Sweden

[21] Appl. No.: 508,073

[22] Filed: Jul. 27, 1995

[51] Int. Cl.⁶ ................................................. A01K 89/02
[52] U.S. Cl. ........................................... 242/246; 242/322
[58] Field of Search ................................... 242/244, 246, 242/322, 318

[56] References Cited

U.S. PATENT DOCUMENTS

| | | | |
|---|---|---|---|
| 3,198,456 | 8/1965 | Wood | 242/244 X |
| 3,682,411 | 8/1972 | Dumbauld | 242/246 |
| 4,951,897 | 8/1990 | Takeuchi | 242/246 |
| 5,149,008 | 9/1992 | Oi | 242/322 X |
| 5,222,688 | 6/1993 | Forslund et al. | 242/246 |
| 5,370,329 | 12/1994 | Kono | 242/246 |

FOREIGN PATENT DOCUMENTS

| | | | |
|---|---|---|---|
| 2123661 | 2/1984 | United Kingdom | 242/246 |

*Primary Examiner*—Daniel P. Stodola
*Assistant Examiner*—Emmanuel M. Marcelo
*Attorney, Agent, or Firm*—Browdy and Neimark

[57] ABSTRACT

A line spool assembly for mounting on a spindle in an open-face fishing reel of the fixed-spool type comprises a hollow shaft non-rotatably mountable on the spindle and having a front portion, a rear portion and an externally threaded intermediate portion, and a line spool rotatably mounted on the shaft. A line spool drag for adjustable braking of the rotation of the line spool around the shaft has at least two drag washers, one of which is non-rotatably connected to the shaft and the other is non-rotatably connected to the line spool and which are in rotation-impeding frictional engagement with each other. An adjusting knob for adjusting the braking effect of the line spool drag is rotatably mounted on the rear portion of the shaft behind the line spool. An adjusting nut which is non-rotatably connected to the adjusting knob and which is in threaded engagement with the threaded intermediate portion of the shaft in order to press, via a resilient member, the drag washers towards each other by a force adjustable by rotation of the adjusting knob.

8 Claims, 2 Drawing Sheets

FISHING REEL DRAG WITH ADJUSTING KNOB BEHIND THE SPOOL

BACKGROUND OF THE INVENTION

The present invention relates to a line spool assembly for mounting on a spindle in an open-face fishing reel of the fixed-spool type.

A line spool assembly of this type is known from, for instance, U.S. Pat. No. 5,007,602. This prior-art assembly comprises a line spool which has a central portion on which a line is wound, and two radially projecting end flanges which are located on both sides of the central portion.

The line spool is rotatably mounted on a hollow shaft which is non-rotatably connected to a spindle in an open-face fishing reel of the fixed-spool type. The hollow shaft is passed over the spindle and retained thereon by resilient means provided on the front end portion of the spindle. A push button in the form of a sleeve is axially displaceable on the front end of the spindle. When the shaft and the line spool mounted thereon should be removed from the spindle, the push button is pressed inwards a distance on the spindle so as to release the resilient means from the shaft such that the shaft can be drawn off the spindle.

A line spool drag for adjustable braking of the rotation of the line spool around the shaft has a first drag washer, which is non-rotatably connected to the line spool and engages the rear side of its rear end flange, a second drag washer, which is non-rotatably connected to the shaft and engages a rear stop lug thereon, and a friction washer, which is provided between the drag washers in frictional engagement therewith. An adjusting knob for adjusting the braking effect of the line spool drag is screwed on the front end of the shaft. The force by which the washers of the line spool drag are pressed against each other determines the braking effect exerted on the line spool during its rotation around the shaft. This force is set by rotation of the adjusting knob, which when rotating in a direction corresponding to an increasing braking effect presses the line spool backwards on the shaft and, thus, increases the compression force exerted on the washers.

When a fish has been hooked onto a lure attached to the free end of the fishing line and is to be taken up, the fish is now and then, for the purpose of tiring it out, allowed to run and pull out more line from the line spool which then rotates around the shaft against the action of the braking effect. During such a tiring-out phase, the drag is adjusted by rotating the adjusting knob by one hand. The fishing line coming from the line spool runs forwards from the line spool and outwards over the adjusting knob. When the adjusting knob is to be rotated to adjust the braking effect, the fishing line may therefore be in the way of the hand and interfere with the adjusting operation.

SUMMARY OF THE INVENTION

The object of the present invention is to provide a line spool assembly, in which the adjusting knob is so positioned that the problem described above is eliminated.

According to the present invention, this object is achieved by means of a line spool assembly for mounting on a spindle in an open-face fishing reel of the fixed-spool type, comprising a hollow shaft non-rotatably mountable on said spindle and having a front portion, a rear portion and an externally threaded intermediate portion;

a line spool rotatably mounted on said shaft, a line spool drag for adjustable braking of the rotation of said line spool around the shaft, said line spool drag having at least two drag washers, one of which is non-rotatably connected to said shaft and the other is non-rotatably connected to the line spool and which are in rotation impeding frictional engagement with each other;

an adjusting knob for adjusting the braking effect of said line spool drag, said knob being rotatably mounted on the rear portion of said shaft behind the line spool; and an adjusting nut which is non-rotatably connected to said adjusting knob and which is in threaded engagement with the threaded intermediate portion of said shaft in order to press, via a resilient member, the drag washers towards each other by a force adjustable by rotation of said adjusting knob.

BRIEF DESCRIPTION OF THE DRAWINGS

The invention will now be described in more detail with reference to the accompanying drawings in which.

DESCRIPTION OF THE PREFERRED EMBODIMENT

Figure 2:
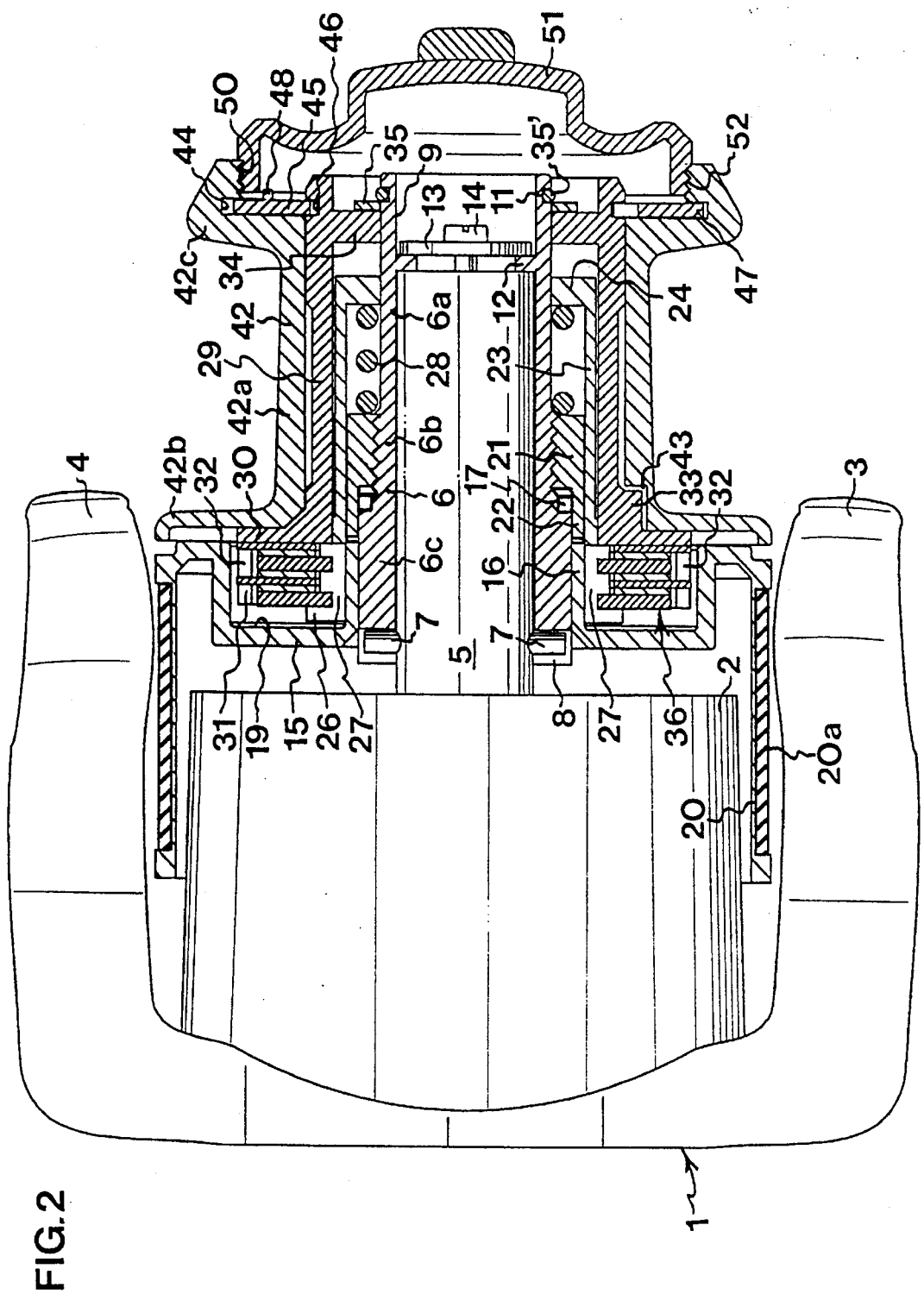
FIG. 2 is an axial longitudinal section of the line spool assembly in FIG. 1, the line spool assembly being shown mounted on a spindle in a schematically and only partly illustrated fishing reel of the fixed-spool type.

The fishing reel shown schematically and only partly in FIG. 2 is an open-face fishing reel of the fixed-spool type and has a rotor 1 with a cylinder part 2 and two diametrically opposed arms 3 and 4 which are integrated with the cylinder part 2 and extend axially forwards at a radial distance therefrom. The arms 3 and 4 constitute attachments for a pivotable bail (not shown). An axially oscillatable spindle 5 extends through the rotor 1 and projects forwardly therefrom. The fishing reel of the fixed-spool type is, apart from the line spool assembly according to the present invention, of prior-art type (see e.g. U.S. Pat. No. 4,927,094) and is therefore not described in more detail here.

It should be noted that "forwards", "backwards", "front" and "rear" in this specification and in the accompanying claims are used with reference to the position of the fishing reel when, mounted on a fishing rod, used by an angler. The direction forwards thus is in the direction to the right in FIG. 2.

Figure 1:
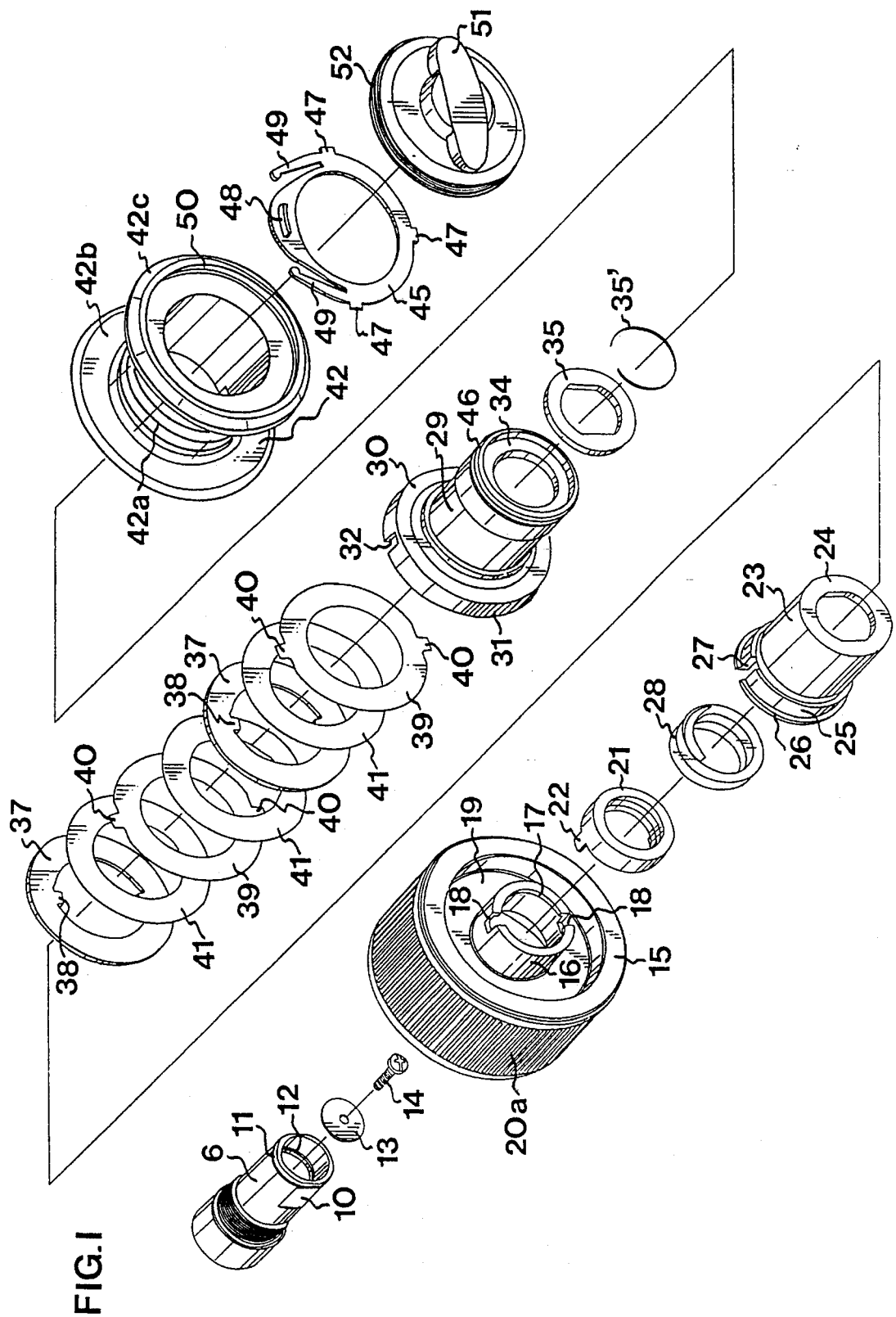
FIG. 1 is an exploded view illustrating a line spool assembly according to the present invention.

The line spool assembly shown in the drawings has a hollow shaft 6 which is non-rotatably connected to the spindle 5 by means of a diametrically projecting pin 7 provided on the spindle and engaging in a mating recess 8 in the rear end surface of the shaft 6. The hollow shaft 6 has a through bore 9, the diameter of which is equal to the diameter of the spindle 5. The shaft 6 has a front portion 6a, an externally threaded intermediate portion 6b having a greater diameter than the front portion 6a, and a rear portion 6c having a greater diameter than the intermediate portion 6b. Two planar surfaces 10 (of which only one is to be seen in FIG. 1) are formed diametrically opposite each other in the front portion 6a of the shaft 6, thereby forming a flat. The shaft 6 has an external circumferential groove 11 in the vicinity of its front end. The shaft 6 has a circumferential internal lug 12 in its front portion 6a. The shaft 6 is axially fixed to the spindle by means of an attachment washer 13, which abuts against the internal lug 12 of the shaft 6 and is attached to the spindle 5 by means of a screw 14 which is axially screwed into the spindle.

An adjusting knob 15 is rotatably mounted on the rear portion 6c of the shaft 6. The knob 15 has a sleeve-shaped hub portion 16 whose front end has a radially inwardly directed circumferential flange 17 which engages the front edge of the rear portion 6c to prevent the knob 15 from being rearwardly displaced on the shaft 6. Two diametrically opposed, axially forwardly open slits 18 are formed at the front end of the hub portion 16. The knob 15 has a forwardly open, circumferential depression 19 surrounding the hub portion 16, and a cylindrical portion 20 which is positioned radially outside the depression 19 and extends backwards a distance over the cylinder part 2 of the rotor 1. The cylindrical portion 20 has an external rubber coating 20a which provides an excellent gripping surface and facilitates manual rotation of the knob 15.

An adjusting nut 21 having the same outer diameter as the hub portion 16 is screwed to the threaded intermediate portion 6b of the shaft 6. The nut 21 has two diametrically opposed, axially backwardly projecting projections 22 whose shape corresponds to the slits 18 in the hub portion 16 and which each engage axially slidably in one of the slits to produce a non-rotatable connection between the adjusting knob 15 and the adjusting nut 21. On rotation of the knob 15, the nut 21 is thus carried along in the rotation, whereby it is axially displaced along the shaft 6 by the threaded engagement with the intermediate portion 6b of the shaft 6.

A bearing sleeve 23, whose inner diameter equals the outer diameter of the hub portion 16 and the adjusting nut 21, extends from the front portion 6a of the shaft 6 over the nut 21 and the hub portion 16 into the depression 19 of the adjusting knob 15. The bearing sleeve 23 has a circumferential, radially inwardly directed front end flange 24, whose centre hole has a shape corresponding to the cross-section of the shaft 6 in its portion having the planar surfaces 10 (the flat) and which thus holds the bearing sleeve 23 non-rotatable on the shaft 6. The bearing sleeve 23 also has a rear portion 25 which has a slightly greater diameter than that of the rest of the sleeve and is provided with a circumferential, radially projecting rear end flange 26. The rear portion 25 of the bearing sleeve 23 has two diametrically opposed slits 27 (of which only one is to be seen in FIG. 1) which extend into the rear portion 25 from the rear edge thereof.

A compression spring 28 is provided between the adjusting nut 21 and the front end flange 24 of the bearing sleeve 23 and abuts against the front end surface of the nut 21 and the rear side of the end flange 24.

An inner sleeve member 29 is rotatably mounted on the bearing sleeve 23. The inner sleeve member 29 has, in its rear portion, a circumferential, radially projecting flange 30, and a cylindrical portion 31 projecting a short distance backwards from this flange. The cylindrical portion 31 has two diametrically opposed slits 32 extending axially into the cylindrical portion 31 from the rear edge thereof. The inner sleeve member 29 has, immediately in front of the flange 30, a radially projecting lug 33 and has, at its front end, a radially inwardly directed end flange portion 34, whose inner diameter is equal to the outer diameter of the shaft 6 in the front portion 6a thereof. A supporting ring 35, whose centre hole has a shape corresponding to the cross-section of the shaft 6 in its front portion 6a having the planar surfaces 10 (the flat), is non-rotatably arranged on the shaft 6 and abuts against the end flange portion 34 of the inner sleeve member 29. A snap ring 35' is arranged in the circumferential groove 11 of the shaft 6 for preventing the supporting ring 35, the inner sleeve member 29, the bearing sleeve 23 and the compression spring 28 from being drawn off the shaft 6.

A line spool drag 36, which comprises two drag washers 37, which have two diametrically opposed, radially inwardly directed projections 38 and are, via the bearing sleeve 23, non-rotatably connected to the shaft 6 by these projections 38 engaging in the slits 27 in the rear portion 25 of the bearing sleeve 23, two drag washers 39, which have two diametrically opposed, radially outwardly directed projections 40 and are non-rotatably connected to the inner sleeve member 29 by these projections 40 engaging in the slits 32 in the cylindrical portion 31, and three friction washers 41. The line spool drag 36 is composed of two groups of washers, each group comprising a drag washer 37 non-rotatably connected to the shaft 6, a drag washer 39 non-rotatably connected to the inner sleeve member 29, and a intermediate friction washer 41, as well as of a friction washer 41 arranged between the two groups. The line spool drag 36 is provided between the rear end flange 26 of the bearing sleeve 23 and the flange 30 of the inner sleeve member 29, thereby producing an adjustable braking effect between the shaft 6 and the inner sleeve member 29, the adjustability being described in more detail below.

When the adjusting knob 15 is rotated, also the adjusting nut 21 is, as described above, rotated to be axially displaced along the shaft 6 by the threaded engagement with the intermediate portion 6b of the shaft 6. When the knob 15 is rotated in such a direction that the nut 21 is displaced forwards, the nut presses, via the compression spring 28, the bearing sleeve 23 forwards more forcefully. As a result, the washers 37, 39 and 41 of the line spool drag 36 are pressed more firmly together between the rear end flange 26 of the bearing sleeve 23 and the flange 30 of the inner sleeve member 29, such that the braking effect of the line spool drag 36 increases. Correspondingly, the braking effect of the line spool drag 36 decreases, when the knob 15 is rotated in the opposite direction, i.e. in such a direction that the nut 21 is displaced backwards.

An outer sleeve member 42, which has a central portion 42a, on which a line (not shown) is to be wound, and two radially projecting end flanges 42b, 42c positioned on both sides of the central portion 42a, is passed over the inner sleeve member 29. The outer sleeve member 42 is non-rotatable relative to the inner sleeve member 29 by the projecting lug 33 thereof engaging in a corresponding recess 43 inside the outer sleeve member 42, when the rear end flange 42b thereof engages the flange 30 of the inner sleeve member 29.

The front end flange 42c of the outer sleeve member 42 has an internal circumferential groove 44. A releasable locking element 45 in the form of a spring element engages both in this circumferential groove 44 and in an external circumferential groove 46 at the front end of the inner sleeve member 29. The locking element 45, which thus holds the outer sleeve member 42 axially fixed to the inner sleeve member 29, is resiliently releasable from the circumferential groove 46 of the inner sleeve member 29 in order to permit release of the outer sleeve member 42 from the inner sleeve member 29. The locking element 45 consists of a ring whose inner diameter is slightly greater than the outer diameter of the inner sleeve member 29 in the front portion. The ring has three radially outwardly directed projections 47 which in the position shown in the drawings project laterally and downwards, a forwardly projecting upper gripper lug 48, and two resilient arms 49 projecting substantially tangentially upwards. The projections 47 and the resilient arms 49 engage in the circumferential groove 44 of the outer sleeve member 2, the locking element 45 being pressed down by the resilient arms 49, such that its upper portion engages in the circumferential groove 46 of the inner sleeve member 29. When the locking element 45 is to be released, the lug 48 is pressed upwards, whereby the locking element is raised, against the spring action of the arms 49, out of its engagement with the circumferential groove 46 of the inner sleeve member 29, such that the outer sleeve member 42 can be drawn off the inner one.

The front end flange 42c of the outer sleeve member 42 has an internal thread 50 which defines a front opening. A cap 51 with an external thread 52 is screwed into this front opening.

When one wants to fish with a line spool, whose central portion has a different depth or whose end flanges are designed in a different manner, or if one wants to easily replace the fishing line by a new fishing line with a different thickness, the cap 51 is screwed off, whereupon the locking element 45 is released from the circumferential groove 46 of the inner sleeve member 29. The outer sleeve member 42 is then drawn off the inner sleeve member 29 and replaced by a new outer sleeve member, which has the desired shape and carries a line with the desired thickness. When the new outer sleeve member reaches the position shown in FIG. 2, its locking element snaps into the circumferential groove 46 of the inner sleeve member 29. After that, the cap 51 is screwed on again.

Since the adjusting knob 15 is located on the rear portion 6c of the shaft 6 and has been given a diameter which is slightly greater than the diameter of the rotor 2, it is readily available to be rotated by one hand, without the fishing line running from the line spool assembly being in the way and interfering with the adjustment of the braking effect of the line spool drag 36.

What I claim and desire to secure by Letters Patent:

1. A line spool assembly for mounting on a spindle of an open-face fishing reel of the fixed-spool type, the spindle having a front free end, the line spool assembly comprising:

a hollow shaft non-rotatably mountable on said spindle and having a front portion, a rear portion and an externally threaded intermediate portion;

a line spool rotatably mounted on said shaft, a line spool drag for adjustable braking of the rotation of said line spool around the shaft, said line spool drag having at least two drag washers, one of which is non-rotatably connected to said shaft and the other is non-rotatably connected to the line spool and which are in rotation-impeding frictional engagement with each other;

an adjusting knob for adjusting the braking effect of said line spool drag, said knob being rotatably mounted on the rear portion of said shaft behind the line spool; and an adjusting nut which is non-rotatably connected to said adjusting knob and which is in threaded engagement with the threaded intermediate portion of said shaft in order to press, via a resilient member, the drag washers towards each other by a force adjustable by rotation of said adjusting knob.

2. A line spool assembly as claimed in claim 1, wherein the adjusting nut is axially displaceable relative to said adjusting knob.

3. A line spool assembly as claimed in claim 1, wherein the adjusting knob has a sleeve-shaped hub portion whose front end has at least one axially forwardly open slit, and the adjusting nut has an axially rearwards projecting projection corresponding to said slit and engaging axially displaceable in said slit and providing a non-rotatable connection between said adjusting knob and said adjusting nut.

4. A line spool assembly for mounting on a spindle of an open-face fishing reel of the fixed-spool type, the line spool assembly comprising:

a hollow shaft non-rotatably mountable on said spindle and having a front portion, a rear portion and an externally threaded intermediate portion;

a line spool rotatably mounted on said shaft, a line spool drag for adjustable braking of the rotation of said line spool around the shaft, said line spool drag having at least two drag washers, one of which is non-rotatably connected to said shaft and the other is non-rotatably connected to the line spool and which are in rotation-impeding frictional engagement with each other;

an adjusting knob for adjusting the braking effect of said line spool drag, said knob being rotatably mounted on the rear portion of said shaft behind the line spool; and an adjusting nut which is non-rotatably connected to said adjusting knob and which is in threaded engagement with the threaded intermediate portion of said shaft in order to press, via a resilient member, the drag washers towards each other by a force adjustable by rotation of said adjusting knob;

wherein the adjusting knob has a sleeve-shaped hub portion whose front end has at least one axially forwardly open slit, and the adjusting nut has an axially rearwards projecting projection corresponding to said slit and engaging axially displaceable in said slit and providing a non-rotatable connection between said adjusting knob and said adjusting nut;

wherein said adjusting knob has a depression which surrounds the hub portion and in which the drag washers are positioned.

5. A line spool assembly as claimed in claim 4, wherein said adjusting knob has, radially outside said depression, a cylindrical portion extending backwards.

6. A line spool assembly as claimed in claim 5, wherein the cylindrical portion of said adjusting knob has an external rubber coating.

7. Line spool assembly as claimed in claim 4, wherein said line spool has an inner sleeve member rotatably mounted on said shaft, and an outer sleeve member which is non-rotatably mounted on said inner sleeve member and is axially fixed thereto by means of a releasable locking element, said inner sleeve member has a radially projecting rear flange, a radially projecting rear flange non-rotatably connected to said shaft is arranged behind the rear flange of said inner sleeve member, and the drag washers are provided between said flanges.

8. A line spool assembly as claimed in claim 7, wherein the rear flange non-rotatably connected to said shaft is formed on a sleeve, which is non-rotatably arranged on said shaft and extends from the front portion of said shaft over the adjusting nut and the hub portion of said adjusting knob into the depression of said adjusting knob and constitutes a bearing sleeve for rotatable mounting of the inner sleeve member on said shaft, said sleeve having a radially inwards projecting front flange, and said resilient member being provided inside said sleeve between the adjusting nut and said front flange.

* * * * *